United States Patent
Minamiguchi

(10) Patent No.: US 8,531,925 B2
(45) Date of Patent: Sep. 10, 2013

(54) OPTICAL DISC DEVICE AND LASER BEAM POWER CONTROLLING METHOD FOR OPTICAL DISC DEVICE

(75) Inventor: Shuichi Minamiguchi, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/348,706

(22) Filed: Jan. 12, 2012

(65) Prior Publication Data
US 2012/0182845 A1   Jul. 19, 2012

(30) Foreign Application Priority Data
Jan. 13, 2011   (JP) .................................. 2011-005182

(51) Int. Cl.
*G11B 7/00*   (2006.01)
(52) U.S. Cl.
USPC .................. 369/44.32; 369/53.26; 369/53.28; 369/94
(58) Field of Classification Search
USPC ............... 369/94, 44.25–44.28, 44.31, 44.32, 369/116, 47.5, 53.23, 53.26, 53.28, 53.12
See application file for complete search history.

(56) References Cited

U.S. PATENT DOCUMENTS

| | | | |
|---|---|---|---|
| 5,214,626 A * | 5/1993 | Satoh et al. | 369/44.28 |
| 2002/0048236 A1* | 4/2002 | Tada et al. | 369/44.27 |
| 2002/0145952 A1* | 10/2002 | Kono | 369/116 |
| 2008/0056094 A1* | 3/2008 | Nakao et al. | 369/94 |
| 2009/0213704 A1* | 8/2009 | Yamamuro | 369/44.29 |
| 2011/0002117 A1* | 1/2011 | Kayama et al. | 362/235 |
| 2011/0158063 A1* | 6/2011 | Minamiguchi et al. | 369/44.26 |
| 2011/0211432 A1* | 9/2011 | Izawa et al. | 369/47.5 |

FOREIGN PATENT DOCUMENTS

| | | |
|---|---|---|
| JP | 61-142538 | 6/1986 |
| JP | 64-10431 | 1/1989 |
| JP | 2001-176077 | 6/2001 |
| JP | 2011-134404 | 7/2011 |
| JP | 2011-134414 | 7/2011 |

* cited by examiner

*Primary Examiner* — Thang Tran
(74) *Attorney, Agent, or Firm* — Antonelli, Terry, Stout & Kraus, LLP.

(57) ABSTRACT

Erroneous data erasure owing to radiation of laser beam with excessive power to the recording layer of the multilayered optical disc upon servo-off while reproducing data of the disc is prevented. When detecting the servo-off based on the amplitude of the tracking error signal or the focus error signal, the laser beam power is reduced to a predetermined minimum value, and the laser beam power value is set again based on the address of the recording medium, which has been obtained later for reproduction. The laser beam power value is changed by applying an offset to the drive current or changing the target value under APC.

6 Claims, 7 Drawing Sheets

FIG. 2

| RECORDING LAYER | BD-R 3-LAYER | BD-R 4-LAYER | BD-RE 3-LAYER |
|---|---|---|---|
| L0 | 1.20mW | 1.20mW | 1.44mW |
| L1 | 1.20mW | 1.20mW | 1.44mW |
| L2 | 1.10mW | 1.20mW | 1.0mW |
| L3 |  | 1.10mW |  |

(REPRODUCTION POWER)

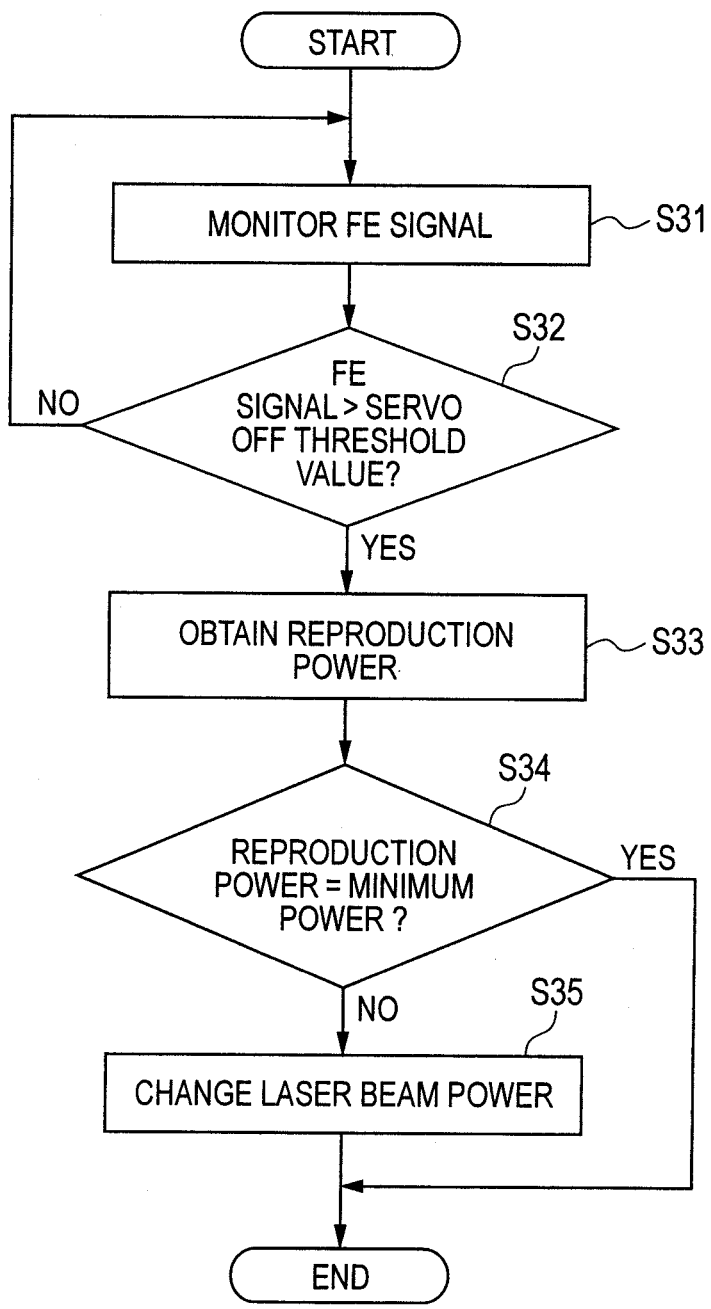

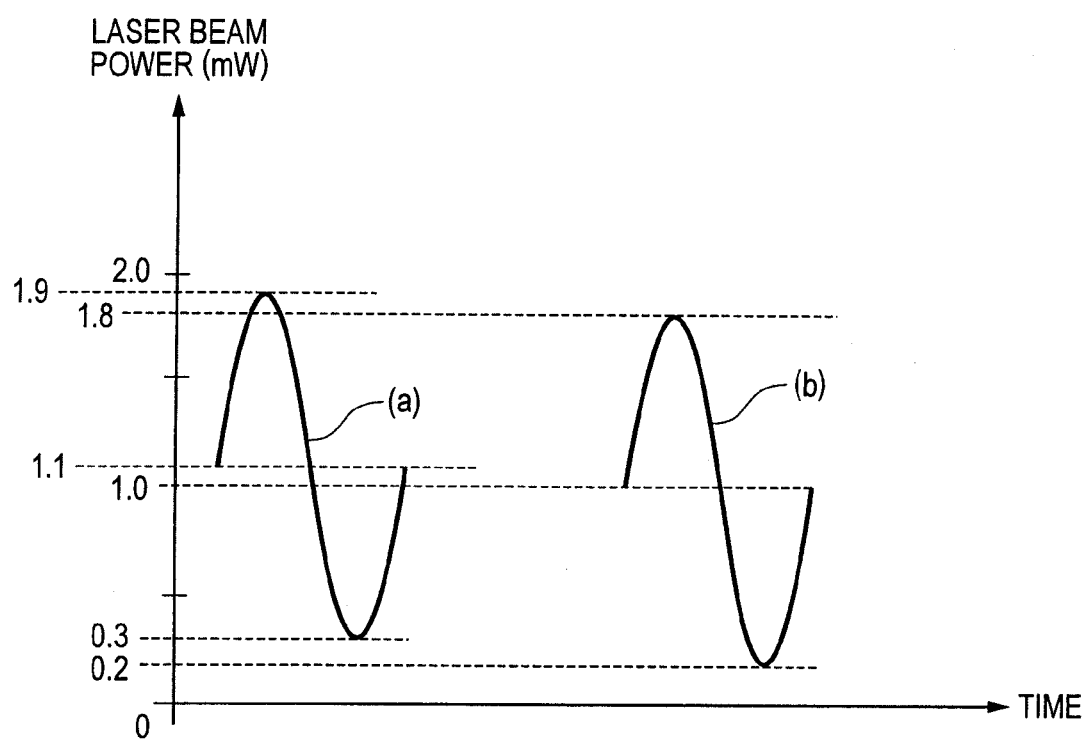

OPTICAL DISC DEVICE AND LASER BEAM POWER CONTROLLING METHOD FOR OPTICAL DISC DEVICE

INCORPORATION BY REFERENCE

This application relates to and claims priority from Japanese Patent Application No. 2011-005182 filed on Jan. 13, 2011, the entire disclosure of which is incorporated herein by reference.

BACKGROUND OF THE INVENTION (1) Field of the Invention

The present invention relates to an optical disc device and a laser beam power controlling method for the optical disc device, more particularly, which suppress erroneous data erasure owing to a servo-off in a multilayered disc.

(2) Description of the Related Art

Recently, an optical disc such as a DVD (Digital Versatile Disc) and a BD (Blu-ray Disc) has been developed to have a multilayered structure for higher storage capacity by increasing the number of recording layers. The BD of 3-layer or 4-layer type has been developed, and an optical disc device which allows the information data to be written to or read from the multilayered optical disc has also been under development.

As is well known, the information data written into the optical disc are read by irradiating laser beams from an optical pickup of the optical disc device so that the recording layer where the subject information data which have been written is focused, and by detecting the reflected light. On this occation, power of the laser beam is far lower than the power consumed for writing or erasing the information. When reading the information data, the laser beam power is severely controlled so as to prevent erroneous erasure of the information data caused by irradiation of high power laser beam by mistake.

Japanese Patent Application Laid-Open No. S61(1986)-142538 discloses the device for reducing quantity of laser beam incident on a recording medium upon operation other than recording, reproduction and erasing.

Japanese Patent Application Laid-Open No. S64(1988)-10431 discloses the device for reducing the laser beam power when the servo control is in the unlock state.

Japanese Patent Application Laid-Open No. 2001-176077 discloses the device for reducing the laser beam power to the one at reproduction in case of servo-control-off when recording the data in the multilayered optical disc.

SUMMARY OF THE INVENTION

An additional problem has to be solved when reading the information data written into the multilayered optical disc where the power of the laser beam for reading the information data is different depending on the recording layer. For example, the optical disc of 4-layer type includes four recording layers of L0, , L1, L2 and L3, which are laid from the far side to the near side from the optical pickup. Generally, the laser beam power is increased for reading the information data from the recording layer at the farther side. For example, the laser beam passes the respective recording layers of the L3, L2, and L1 in sequence before reaching the L0 layer. As the laser beam passes each of the recording layers, the power may be lost by approximately 4%. The power of the laser beam to be irradiated is set in accordance with the recording layer, which will be described later.

If the laser beam with higher power is irradiated by mistake to the recording layer which requires lower power for reading the information data, the information data in such recording layer will be erroneously erased, or worse yet, destroyed. In the case where the servo-control-off occurs in the multilayered optical disc, there may be the case that the inappropriate recording layer is focused by the laser beam erroneously. That is, when the servo-control-off occurs while reading the information data from the recording layer using the laser beam with higher power, and the recording layer which requires the laser beam with lower power for reading the information data is inappropriately focused, the information data may be erroneously erased, or worse yet, destroyed.

The present invention provides an optical disc device and a laser beam power controlling method for the optical disc device for suppressing erroneous data erasure owing to servo-off in the multilayered disc.

The present invention provides an optical disc device which reproduces information data recorded in an optical disc with a plurality of recording layers using a laser beam, which is provided with an optical pickup that includes a laser light source for generating the laser beam, an objective lens for irradiating the recording layers of the optical disc with the laser beam, a focus actuator for finely adjusting a vertical position of the objective lens with respect to a recording track of the recording layer of the optical disc, a tracking actuator for finely adjusting a radial position of the objective lens with respect to the recording track of the recording layer of the optical disc, and an optical detector that detects the laser beam reflecting from the optical disc, and reads and converts the information data written in the recording track of the recording layer of the optical disc into an electric signal so as to be output. The device further includes a servo control unit which generates a first drive signal used for finely adjusting the vertical position of the objective lens with respect to the recording track of the recording layer of the optical disc so that the signal is supplied to the focus actuator, a second drive signal used for finely adjusting the radial position of the objective lens with respect to the recording track of the recording layer of the optical disc so that the signal is supplied to the tracking actuator, and a third drive signal used for finely adjusting power of the laser beam generated by the laser light source so that the signal is supplied to the optical pickup. It is also provided with a signal processing unit which processes the electric signal output from the optical pickup, and generates a focus error signal indicating an error of the vertical position of the objective lens with respect to the recording track of the recording layer of the optical disc, and a tracking error signal indicating an error of the radial position of the objective lens with respect to the recording track of the recording layer of the optical disc, both of which are supplied to the servo control unit for generation of the first and the second drive signals. When a servo-control-off relative to the position of the objective lens with respect to the recording track occurs, the servo control unit generates the third drive signal that is supplied to the optical pickup so that the laser beam power is set to a specified power value corresponding to the recording layer from which the information data are read using the lowest power value among those required for other recording layers.

The present invention provides a laser beam power controlling method for an optical disc device for reproducing information data stored in an optical disc with a plurality of recording layers using a laser beam, which includes servo-off detection step which detects a servo-control-off relevant to the laser beam with respect to the recording layer, first power obtaining step which obtains a current power value of the laser beam upon detection of the servo-off in the servo-off detection step, first power set step which sets the laser beam power value to a lowest power value when the laser beam power value obtained in the first power obtaining step is not the lowest power value among those required for the plurality of recording layers, address obtaining step which obtains a current address of the recording layer using the laser beam power set in the first power set step, second power obtaining step which obtains the laser beam power value specified corresponding to the recording layer identified based on the address obtained in the address obtaining step, and second power set step which sets the laser beam power value to a power value obtained in the second power obtaining step when the power value obtained in the second power obtaining step is different from the current laser beam power value. The servo control is continuously executed to reproduce the information data in spite of detection of the servo-off.

The present invention provides the optical disc device and the laser beam power controlling method for the optical disc device for suppressing erroneous data erasure owing to the servo-off in the multilayered disc. This may contribute to improvement in reliability of the optical disc device.

BRIEF DESCRIPTION OF THE DRAWINGS

These and other features, objects and advantages of the present invention will become more apparent from the following description when taken in conjunction with the accompanying drawings wherein:

FIG. 2 is a table indicating laser beam power values required for reading data from multilayered BDs;

FIG. 3 is a flowchart representing the process for changing the laser beam power upon servo-off according to an example;

FIG. 7 is a waveform diagram of the laser beam power according to an example.

DETAILED DESCRIPTION OF THE EMBODIMENT

Figure 1:
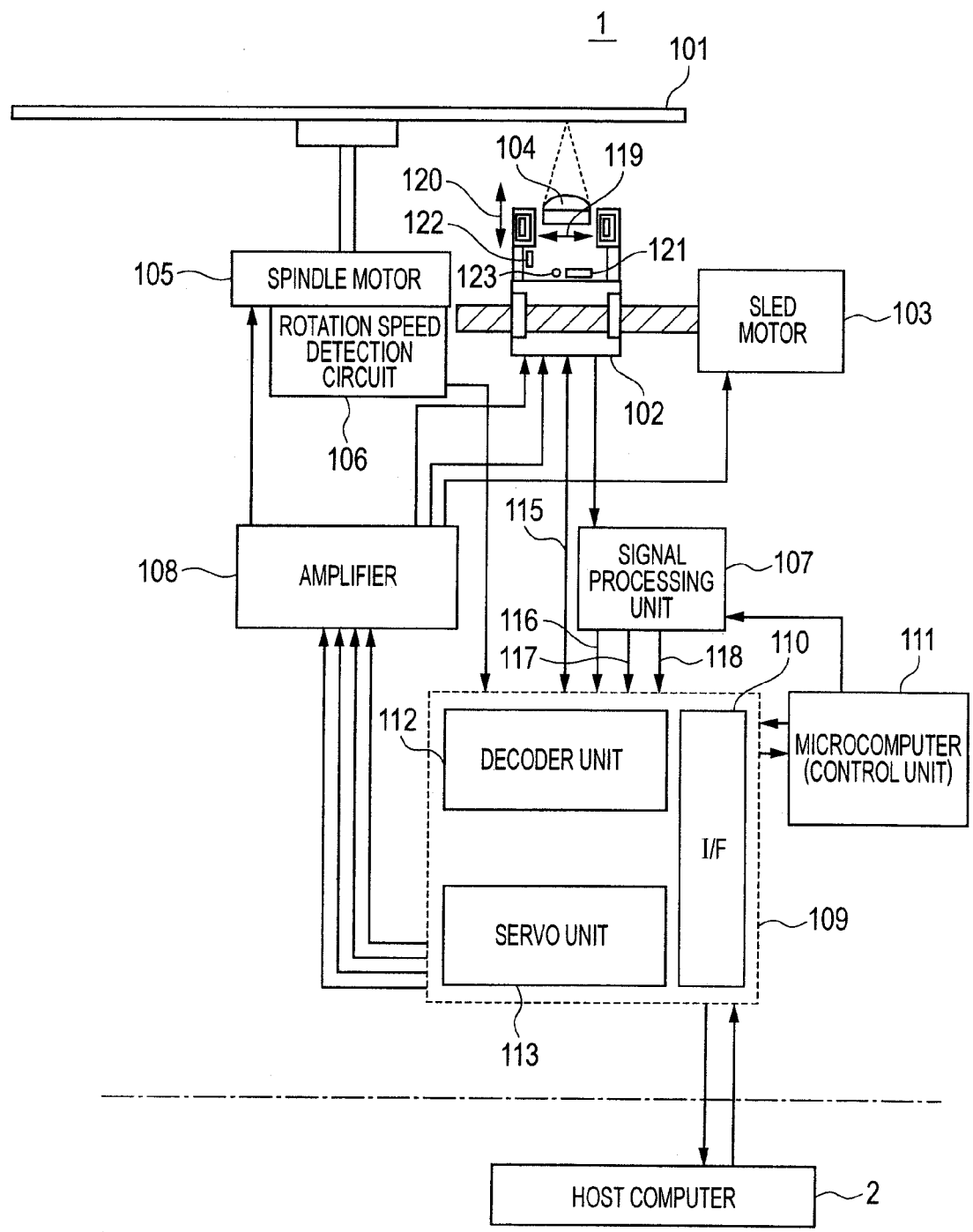
FIG. 1 is a block diagram of an optical disc device according to an example.

An example of the present invention will be described referring to the drawings. A general operation of an optical disc device will be described.

FIG. 1 is a block diagram of an optical disc device 1 according to an example of the present invention. An optical disc 101 as a recording medium may be a DVD or a BD. It may be recordable type which allows recording only once, for example, a DVD-R and a BD-R, rewritable type such as a DVD-RAM and a BD-RE, and read-only type such as a DVD-ROM. This example is especially effective for using the multilayered optical disc. The loaded optical disc 101 is driven to rotate by a spindle motor 105 at a predetermined rotation speed (for example, a rotation speed as a given linear speed at a position where data are recorded/reproduced). A spindle motor drive signal for the aforementioned operation is generated by a servo unit 113 contained in a DSP (Digital Signal Processor) 109, while having power amplified by an amplifier 108 so as to be supplied to the spindle motor 105. A rotation speed detection circuit 106 is provided to allow the servo unit 113 to generate the spindle motor control signal. A signal indicating the rotation speed of the spindle motor 105, which is generated by the rotation speed detection circuit 106 is supplied to the DSP 109.

An optical pickup 102 irradiates a recording layer of the optical disc 101 with a laser flux generated by a laser light source 123 via an objective lens 104 for recording or reproduction of the data.

The optical pickup 102 is mounted on a sled mechanism, and radially moves on the optical disc 101 accompanied with rotation of a sled motor 103 so that the data are recorded/reproduced at a predetermined track position. A sled motor control signal for such operation is generated by the servo unit 113 while having power amplified by the amplifier 108, and then supplied to the sled motor 103.

The objective lens 104 is installed in a tracking actuator 119 and a focus actuator 120 using electromagnetic force (FIG. 1 only shows directions in which those actuators 119 and 120 drive the objective lens 104 for the purpose of avoiding complexity).

A tracking actuator control signal generated by the servo unit 113 while having the power amplified by the amplifier 108 is supplied to the tracking actuator 119. Based on the signal, a radial position of the objective lens 104 (tracking direction) with respect to the optical disc 101 is finely adjusted so as to allow correct trace of the laser flux on a predetermined recording track of the optical disc 101. A focus actuator control signal generated by the servo unit 113 while having the power amplified by the amplifier 108 is supplied to the focus actuator 120. Based on the signal, a position of the objective lens 104 in a vertical direction (focus direction) with respect to the optical disc 101 is finely adjusted so as to allow correct focus of the laser flux on a predetermined recording track of the optical disc 101.

An optical detector 121 contained in the optical pickup 102 detects the laser flux reflecting from the optical disc 101, and further detects an information signal recorded in the optical disc 101, which is converted into an electric signal. The detected information signal is supplied to a signal processing unit 107 which includes a circuit block called an AFE (Analog Front End) circuit. The AFE circuit processes the information signal in the phase, which should be essentially processed as the analog signal in spite of digital recording. Specifically, the signal processing unit 107 executes an arithmetic processing of the information signal, for example, generation of a tracking error signal 116 and a focus error signal 117 so as to be supplied to the servo unit 113 contained in the DSP 109. The servo unit 113 generates the servo signals for tracking and focusing, that is, the tracking actuator control signal and the focus actuator control signal as described above based on the supplied tracking error signal 116 and the focus error signal 117. Those signals are supplied to the optical pickup 102 via the amplifier 108 for controlling the tracking and focusing operations as described above.

The signal processing unit 107 equalizes frequency characteristic such as amplitude and phase upon recording/reproducing of the information signal in the optical disc 101 so that an equalized information signal 118 is supplied to a decoder unit 112 contained in the DSP 109. The decoder unit 112 reproduces the information signal recorded in the optical disc 101, for example, executes an extensional process opposite the data compression process executed for the information signal before it is recorded in the optical disc 101 so that the original information signal is decoded. The signal processing unit 107 may be integrated on the same semiconductor chip as that of the DSP 109.

The above-described operations of the optical disc device 1 are executed based on the control signal generated by a microcomputer 111. The microcomputer 111 may also be integrated on the same semiconductor chip as that of the DSP 109. Hereinafter, the microcomputer 111 will be referred to as a control unit 111.

An operation instruction from a user, for example, is generated by a host computer 2 as a higher-level device of the optical disc device 1. An instruction signal generated by the host computer 2 is transferred by an I/F (interface) unit 110 contained in the DSP 109, which mediates the communication between the higher-level device and the optical disc device 1.

The information signal decoded by the decoder unit 112 is supplied to the host computer 2 via the I/F unit 110. When the optical disc device 1 functions in recording the information signal to the optical disc 101, the information signal supplied from the host computer 2 via the I/F unit 110 is subjected to a predetermined modulation operation and encoding for recording by a recording signal processing circuit contained in the signal processing unit 107, and is further recorded in the recording track of the optical disc 1 via the laser flux generated by the optical pickup 102.

The optical pickup 102 includes an FMD (Front Monitor Diode) 122 that generates an FMD signal 115 indicating power of a laser beam generated by the laser light source 123 contained in the optical pickup 102. The signal is then supplied to the DSP 109. The servo unit 113 of the DSP 109 executes an APC (Automatic Power Control) to be described later based on the FMD signal 115. That is, the laser light source 123 is controlled so that the laser beam power reaches a predetermined value in an operation mode at the subject time point.

The tracking error signal 116 includes a signal generated by the signal processing unit 107, for example, a DPD (Differential Phase Detecting) signal and a DPP (Differential Push-Pull) signal. The focus error signal 117 includes a signal generated by the signal processing unit 107, for example, a DAD (Differential Astigmatism Detection) signal.

FIG. 2 represents each laser beam power value upon reading from the multilayered BDs of different type. The respective values are stored in a storage unit (not shown) using a non-volatile memory accessible by the servo unit 113. The table shows exemplary values of BD-R of 3-layer, 4-layer, and BD-RE of 3-layer discs. The laser beam power corresponding to the farthest recording layer (L0 layer) from the optical pickup 102 is the highest. For example, if the servo-control-off occurs during reading from the L0 layer of the BD-RE disc of 3-layer type, and the laser beam with the power at magnitude of 1.44 mW is focused on the L2 layer, there is a possibility that the information data in the L2 layer may be erroneously erased.

In this embodiment to solve the problem described above, when the servo-off occurs upon reading of the information data from the multilayered optical disc in the optical disc device, first of all the servo-off is detected, and power of the laser beam generated by the laser light source 123 is reduced to the value so that the information data in any of the recording layers are not erroneously erased.

Thereafter, an address on the current optical disc is read from the recording layer where the laser beam with the power is focused, and the laser beam power is set to the value given with respect to the recording layer again so that reproduction is continued. It is intended to expedite recovery from the servo-off.

While executing the APC, it is preferable to reduce the laser beam power, and to change a target value of the APC or an offset amount added into the control loop for setting again.

The process for reducing the laser beam power by detecting the servo-off will be described in detail.

FIG. 3 is a flowchart representing a process for changing the laser beam power upon the servo-off according to an example. The process starts with reproduction, and is continuously executed until the end of the reproduction.

In step S31, the servo unit 113 monitors the waveform of the focus error signal 117. Then in step S32, the servo unit 113 determines whether or not the focus error signal 117 has the amplitude larger than a predetermined threshold value. When it is determined that the amplitude is larger than the threshold value (yes in the flowchart), the servo unit 113 determines that the servo-off has occurred, and the process proceeds to step S33. When it is determined that the amplitude is equal to or smaller than the threshold value (no in the flowchart), there is no servo-off, and accordingly, the reproduction may be continued. The process returns to step S31 where the waveform is continuously monitored.

Figure 5:
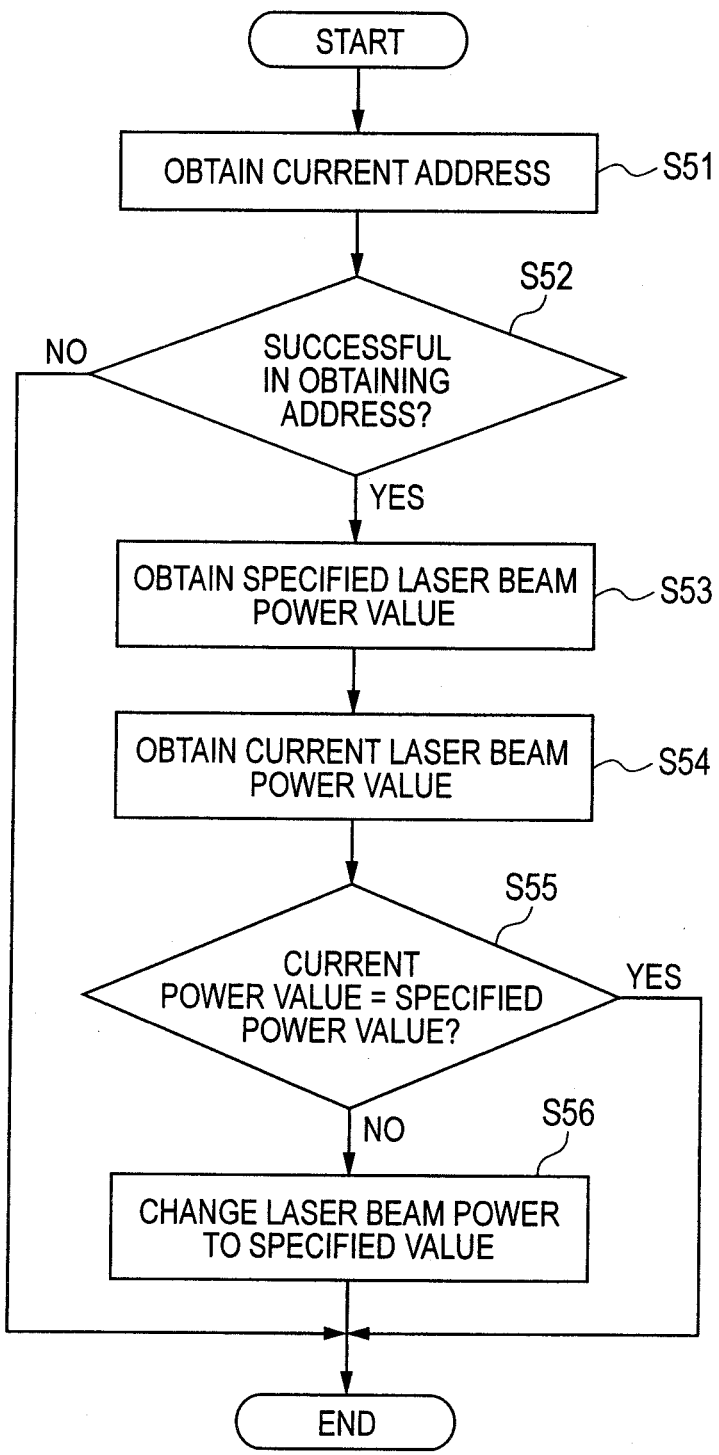
FIG. 5 is a flowchart representing the process for returning the laser beam power after the servo-off according to an example.

In step S33, the servo unit 113 obtains a power value of the current laser beam detected by the FMD 122 of the optical pickup 102. Then in step S34, the servo unit 113 determines whether or not the current laser beam power value is equal to a predetermined minimum value. When it is determined in step S34 that the current laser beam power value is equal to the predetermined minimum value (yes in the flowchart), the process ends. The next process will be started as represented by FIG. 5. When the current laser beam power value is not equal to the predetermined minimum value (no in the flowchart), the process proceeds to step S35 where the servo unit 113 instructs the optical pickup 102 to change the laser beam power value to the predetermined minimum value. Then the next process will be started as represented by FIG. 5. This makes it possible to solve the problem of erroneous erasure of the information data recorded in the optical disc 101 owing to the servo-off.

The predetermined minimum value of the laser beam power in step S34 may be the power value corresponding to the recording layer that is specified to require the laser beam power upon reproduction set to the smallest value. As shown in FIG. 2, the minimum power value is 1.10 mW when the optical disc to be used is the BD-R of 3-layer or 4-layer type. It is 1.0 mW when the optical disc to be used is the BD-RE of 3-layer type. In this way, the minimum power value varies depending on the optical disc type.

As described above, the example is primarily intended to prevent erroneous erasure of data recorded in the recording layer upon the servo-off. The aforementioned object may be accomplished by setting the reproduction power of the laser beam to zero in step S34. In this example, however, it is set to the minimum value rather than zero for the purpose of expediting the recovery from the servo-off as described later referring to FIG. 5.

The method for changing the laser beam power value in step S35 will be described later in detail. The method which allows the servo unit 113 to apply offset to the laser light source drive current supplied to the optical pickup 102, the method which changes the target value under the APC executed by the FMD 122, and the method obtained by combining the aforementioned two methods may be employed.

The method for detecting the servo-off in step S32 based on the amplitude of the focus error signal 117 has been described. In this example, the focus error signal 117 is used in order to avoid focusing of the laser beam on the recording layer other than the target one owing to the servo-off. However, the method executed based on the amplitude of the tracking error signal 116 may accomplish the object as well. The focus servo-off may be detected when the signal indicating the entire quantity of light detected by the optical detector 121, that is, the PE (Pull-in Error) signal is reduced to be equal to or lower than the predetermined value.

An example of the method of detecting the servo-off based on the tracking error signal and the focus error signal, which is executed in step S32 will be described referring to FIGS. 4A and 4B.

Figure 4A:
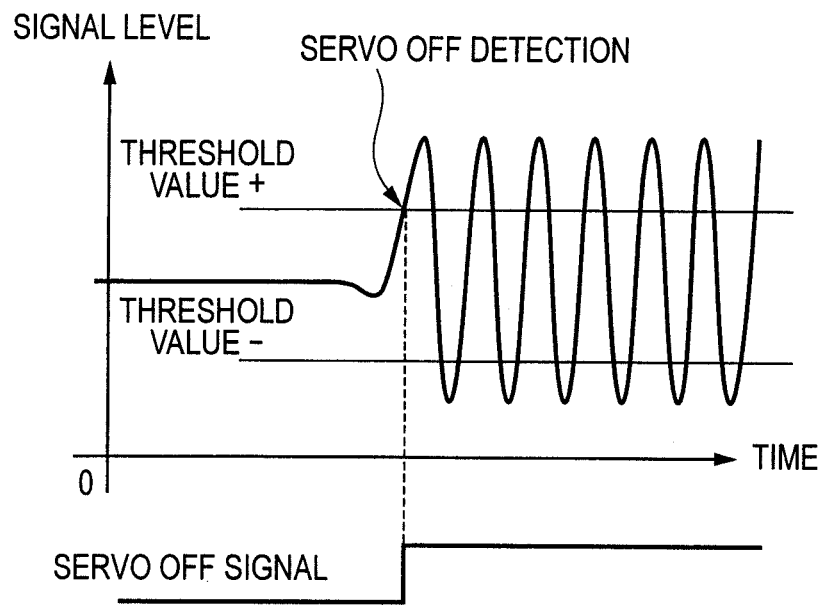
FIG. 4A represents a method of detecting a tracking servo-off according to an example.

FIG. 4A represents the method of detecting a tracking servo-off according to the example. FIG. 4B represents the method of detecting a focus servo-off according to the example.

Referring to FIG. 4A, the tracking error signal 116 has small amplitude upon servo lock in case of either the DPD signal or the DPP signal as described above. Upon the servo-off, the signal becomes an AC signal with large amplitude resulting from passage through the recording track. Threshold values at positive and negative sides are provided so as to be compared with the tracking error signal. When the content that exceeds the threshold value is found, the servo unit 113 determines that the tracking servo-off has occurred, and generates a logical signal indicating the servo-off.

Figure 4B:
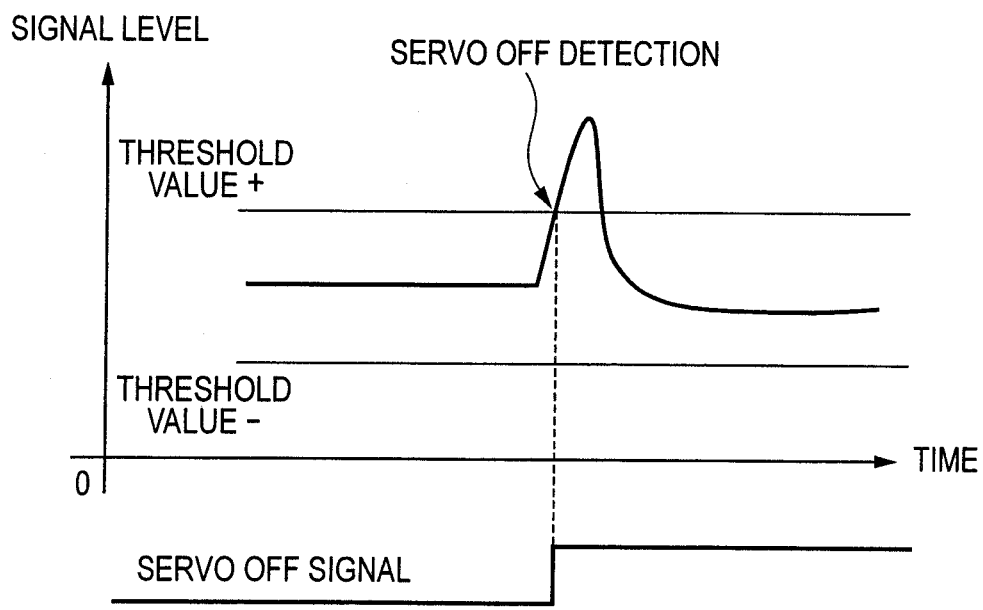
FIG. 4B represents a method of detecting a focus servo-off according to an example.

Referring to FIG. 4B, the servo-off may be detected in the similar way with respect to the focus error signal 117, for example, the DAD signal as described above. Unlike the aforementioned tracking error signal with repetitive AC signals, the focus error signal upon the focus servo-off allows generation of the logical signal by setting the predetermined threshold values to detect the servo-off.

Then the method for returning after completion of the process shown in FIG. 3 will be described.

FIG. 5 is a flowchart representing a process for returning the laser beam power after the servo-off according to the example. In step S51, the control unit 111 instructs the DSP 109 to obtain the current address from the recording layer irradiated with the laser beam.

As described referring to FIG. 3, the laser beam power is set to the predetermined minimum value rather than zero. The power shown in FIG. 2 is required for reading the data recorded in the respective recording layers. For example, when the laser beam power is equal to the predetermined minimum value of 1.10 mW for the BD-R of 3-layer type, it may be difficult to read the data recorded in the L0 layer or the L1 layer. In most of the case, however, the address of the L0 layer or the L1 layer may be read. Unlike the data, the address is read from wobble of the land and groove of the recording track of the respective recording layers. This makes it possible to obtain the current address although the laser beam power is smaller than the predetermined value.

Generally, the laser beam power is set to zero upon the servo-off to return the objective lens 104 to the predetermined initial position for restarting the reproduction which includes application of the focus servo again, and restarting the reproduction. This may cause the problem of requiring long time for the recovery. In this example, the laser beam power is set to the predetermined minimum value rather than zero to obtain the current address without erroneously erasing the recorded data. This may markedly reduce the time required for the recovery.

Then in step S52, the DSP 109 determines whether or not the address has been obtained successfully.

When it is determined that the address has been obtained successfully in step S52 (yes in the flowchart), the process proceeds to step S53 where the servo unit 113 identifies a recording layer based on the obtained address, and obtains the power value specified in the table shown in FIG. 2 corresponding to the identified recording layer from the storage unit (not shown). Then in step S54, the servo unit 113 obtains the current laser beam power value detected by the FMD 122. Then in step S55, the servo unit 113 determines whether or not the current laser beam power value obtained in step S54 is equal to the specified power value obtained in step S53.

When it is determined in step S55 that the current laser beam power value is equal to the specified power value (yes in the flowchart), the current laser beam power value is available with no problem. So the process ends. When it is determined that the current laser beam power value is different from the specified power value (no in the flowchart), the process proceeds to step S56 where the servo unit 113 changes the power value of the laser beam generated by the laser light source 123 to the specified power value. The process then ends.

When it is determined in step S52 that obtaining of the physical address fails (no in the flowchart), the process ends. The control unit 111 is restarted by resetting the reproduction. In this case, if the laser beam power is intensified for obtaining the address, there may cause a risk of erroneous erasure of the data recorded in the recording layer. Therefore, the reproduction is reset for safety.

The APC of the laser beam power will be described.

Figure 6A:
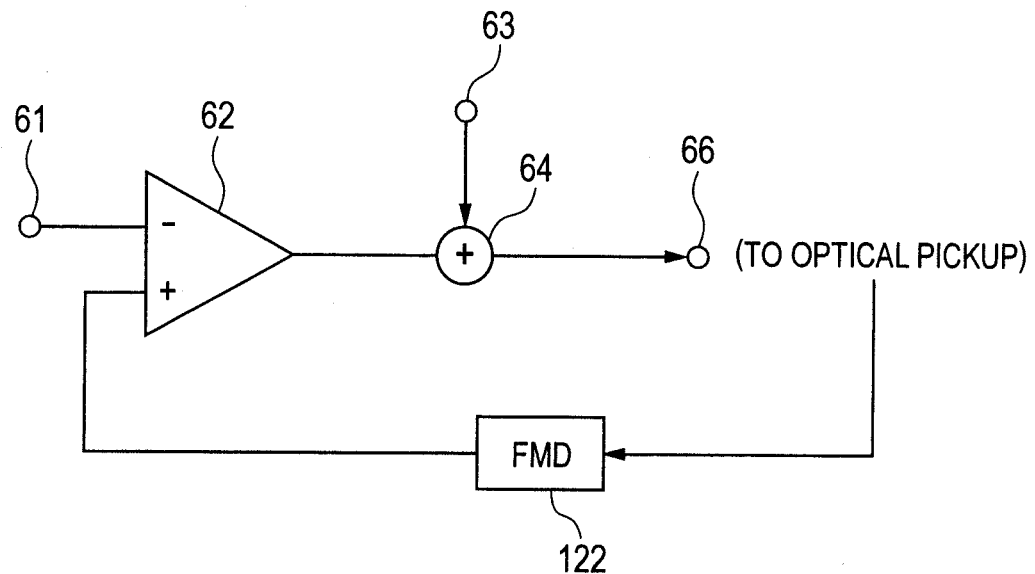
FIG. 6A is a block diagram illustrating an APC circuit according to an example.
Figure 6B:
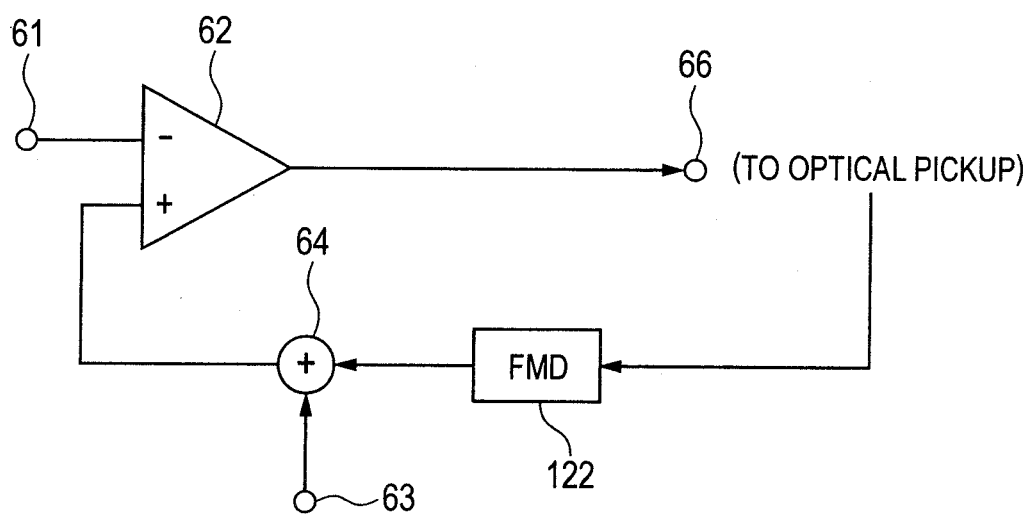
FIG. 6B is a block diagram illustrating another example of the APC circuit according to the example.

FIGS. 6A and 6B are block diagrams each showing an APC circuit according to an example. The APC circuit is contained in the servo unit 113. As described above, either the method for changing the target value of the APC or the method for changing the offset amount added into the control loop may be employed for reducing the laser beam power and resetting. The target value of the APC is supplied to an input terminal 61 by the servo unit 113. The offset amount is supplied to an input terminal 63 by the servo unit 113. An output terminal 66 supplies the signal for controlling the power of the laser light source 123 to the optical pickup 102.

The FMD 122 contained in the optical pickup 102 supplies the detection signal of the power of the laser beam generated in accordance with the control signal from the output terminal 606 to an input terminal of an operational amplifier 62 with a differential input. The feedback loop serves to substantially make the detection signal value conform to the target value input from the input terminal 61 so as to be supplied to the other input terminal of the operational amplifier 62. The laser beam power may be set to the predetermined value by appropriately setting the target value.

The offset amount given from the input terminal 63 is added into the feedback loop by an adder 64 so as to allow setting of the laser beam power. The position of the adder 64 for adding the offset amount is different between FIGS. 6A and 6B. The operation, however, is the same.

In this example, either the target value supplied to the input terminal 61 or the offset amount supplied to the input terminal 63 may be changed to control the laser beam power value. Both the target value and the offset amount may be changed for controlling. When changing the target value supplied to the input terminal 61, the response delays by the amount corresponding to a time constant of the feedback loop. Generally, the response may be expedited by changing the offset amount supplied to the input terminal 63.

The actual laser beam power is subjected to the high frequency superposition for suppressing laser noise, and has the laser power changed sinusoidally around the direct current value (average value) shown in FIG. 2. For example, the offset amount supplied to the input terminal 63 may be changed to vary the laser beam power.

FIG. 7 represents the waveform of the laser beam power according to an example. A waveform (a) shown in FIG. 7 indicates an example derived from reading of the data from the recording layer L2 of the BD-RE of 3-layer type. The laser beam power changes in the range of 1.1+/−0.8 mW. Meanwhile, in the case where the laser beam power is set to the predetermined minimum value owing to the servo-off, the power may be reduced for suppressing the risk of erroneous data erasure. For example, the power may be set in the range of 1.0+/−0.8 mW as shown in the waveform (b) of FIG. 7

As has been described, the present example provides the optical disc device that suppresses erroneous erasure of data in the multilayered disc owing to the servo-off. The example also has an effect of expediting the recovery from the servo-off.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc device which reproduces information data recorded in an optical disc with a plurality of recording layers using a laser beam, comprising:
    an optical pickup that includes a laser light source for generating the laser beam, an objective lens for irradiating the recording layers of the optical disc with the laser beam, a focus actuator for finely adjusting a vertical position of the objective lens with respect to a recording track of the recording layer of the optical disc, a tracking actuator for finely adjusting a radial position of the objective lens with respect to the recording track of the recording layer of the optical disc, and an optical detector that detects the laser beam reflecting from the optical disc, and reads and converts the information data written in the recording track of the recording layer of the optical disc into an electric signal so as to be output;
    a servo control unit which generates a first drive signal used for finely adjusting the vertical position of the objective lens with respect to the recording track of the recording layer of the optical disc so that the signal is supplied to the focus actuator, a second drive signal used for finely adjusting the radial position of the objective lens with respect to the recording track of the recording layer of the optical disc so that the signal is supplied to the tracking actuator, and a third drive signal used for finely adjusting power of the laser beam generated by the laser light source so that the signal is supplied to the optical pickup; and
    a signal processing unit which processes the electric signal output from the optical pickup, and generates a focus error signal indicating an error of the vertical position of the objective lens with respect to the recording track of the recording layer of the optical disc, and a tracking error signal indicating an error of the radial position of the objective lens with respect to the recording track of the recording layer of the optical disc, both of which are supplied to the servo control unit for generation of the first and the second drive signals,
    wherein the servo control unit generates a servo-control-off signal, which indicates an occurrence of a servo-control-off relative to the position of the objective lens with respect to the recording track, based on the focus error signal and/or the tracking error signal; and
    wherein when the servo-control-off signal is detected during reproduction at each laser beam power value upon reading from the optical disc, the servo control unit generates the third drive signal that is supplied to the optical pickup so that the laser beam power is set to a specified power value corresponding to a reading power value of the recording layer which is a lowest power value among those power values required for reading the plurality of recording layers.

2. The optical disc device according to claim 1, wherein:
    when the servo-control-off signal is detected during reproduction at each laser beam power value upon reading from the optical disc, the servo control unit sets the laser beam power to a specified power value corresponding to a reading power value of the recording layer which is a lowest power value among those power values required for reading the plurality of recording layers, identifies the recording layer based on address information read from the recording track of the recording layer to generate and supply the third drive signal to the optical pickup so that the laser beam power is reset to a specified value corresponding to a reading power value for the identified recording layer.

3. The optical disc device according to claim 1, wherein the servo control unit detects the servo-control-off relevant to the position of the objective lens with respect to the recording track based on an amplitude value of one of the tracking error signal and the focus error signal.

4. The optical disc device according to claim 1, wherein:
    the optical pickup includes a front monitor diode for detecting the laser beam power; and
    when the servo-control-off signal is detected during reproduction at each laser beam power value upon reading from the optical disc, the servo control unit generates the third drive signal that is supplied to the optical pickup so that the laser beam power is set to a specified power corresponding to a reading power value of the recording layer which is a lowest power value among those required for reading a plurality of recording layers based on the laser beam power detected by the front monitor diode.

5. A laser beam power controlling method for an optical disc device for reproducing information data stored in an optical disc with a plurality of recording layers using a laser beam, comprising:
    servo-off detection step which detects a servo-control-off relevant to the laser beam with respect to the recording layer;
    first power obtaining step which obtains a current power value of the laser beam upon detection of the servo-off in the servo-off detection step;
    first power set step which sets the laser beam power value to a lowest power value when the laser beam power value obtained in the first power obtaining step is not the lowest power value among those required for the plurality of recording layers;
    address obtaining step which obtains a current address of the recording layer using the laser beam power set in the first power set step;
    second power obtaining step which obtains a laser beam power value specified corresponding to a reading power value for the recording layer identified based on the address obtained in the address obtaining step; and second power set step which sets the laser beam power value to the power value obtained in the second power obtaining step when the power value obtained in the second power obtaining step is different from the current laser beam power value, wherein the servo control is continuously executed to reproduce the information data in spite of detection of the servo-off.

6. An optical disc device which reproduces information data recorded in an optical disc with a first recording layer and a second recording layer using a laser beam, comprising:

a laser light source which generates the laser beam;

an objective lens which irradiates the first and second recording layers of the optical disc with the laser beam;

a focus actuator which adjusts a vertical position of the objective lens with respect to a recording track of the first and second recording layers of the optical disc, a tracking actuator which adjusts a radial position of the objective lens with respect to the recording track of the first and second recording layers of the optical disc;

a signal processing unit which generates a focus error signal indicating an error of the vertical position of the objective lens with respect to the recording track of the first and second recording layers of the optical disc, and a tracking error signal indicating an error of the radial position of the objective lens with respect to the recording track of the first and second recording layers of the optical disc;

a servo control unit which generates a servo-control-off signal, which indicates an occurrence of a servo-control-off relative to the position of the objective lens with respect to the recording track, based on the focus error signal and/or the tracking error signal; and a laser power controller which controls a laser power value of the laser beam;

wherein a first laser power value upon reading from the first recording layer is greater than a second laser power value upon reading from the second recording layer; and when the servo-control-off signal is detected during reproduction at the first laser beam power value upon reading from the first recording layer, the laser power controller changes the laser power value from the first laser beam power value to the second laser beam power value.

* * * * *